US008619152B2

(12) United States Patent
Lee

(10) Patent No.: US 8,619,152 B2
(45) Date of Patent: Dec. 31, 2013

(54) MOBILE TERMINAL AND OPERATING METHOD THEREOF

(75) Inventor: Minho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 543 days.

(21) Appl. No.: 12/907,240

(22) Filed: Oct. 19, 2010

(65) Prior Publication Data

US 2011/0273575 A1   Nov. 10, 2011

(30) Foreign Application Priority Data

May 6, 2010   (KR) .................. 10-2010-0042620

(51) Int. Cl.
 *H04N 5/228*  (2006.01)
 *H04N 5/222*  (2006.01)

(52) U.S. Cl.
 USPC .................................. 348/222.1; 348/333.02

(58) Field of Classification Search
 None
 See application file for complete search history.

(56) References Cited

U.S. PATENT DOCUMENTS 7,720,436 B2 *   5/2010  Hamynen et al. ............ 455/13.1
8,301,202 B2 *  10/2012  Lee ................................ 455/566
2008/0147730 A1 *  6/2008  Lee et al. ................... 707/104.1
2009/0167919 A1 *  7/2009  Anttila et al. ............. 348/333.02
2009/0324058 A1 * 12/2009  Sandage et al. ............... 382/154
2011/0199479 A1 *  8/2011  Waldman ...................... 348/116

FOREIGN PATENT DOCUMENTS

| EP | 2 071 841 | 6/2009 |
| WO | WO 2007/080473 | 7/2007 |

OTHER PUBLICATIONS

Extended European Search Report for Application 10013649.8 dated Jul. 8, 2013.

* cited by examiner

*Primary Examiner* — Luong T Nguyen
(74) *Attorney, Agent, or Firm* — KED & Associates LLP

(57) ABSTRACT

A mobile terminal and an operating method thereof are provided. The mobile terminal includes a camera module; a display module configured to display a preview image provided by the camera module; a wireless communication unit configured to wirelessly communicate with an external device; and a controller configured to obtain location information of the mobile terminal through wireless communication with the external device and obtain object information of a first object displayed in the preview image based on the location information, wherein, if there exists object information of a second object that is overlapped by the first object, the controller displays an notification indicator indicating the existence of the object information of the second object on the display module. Therefore, it is possible to provide information of a wider area than that displayed in a preview image.

17 Claims, 12 Drawing Sheets

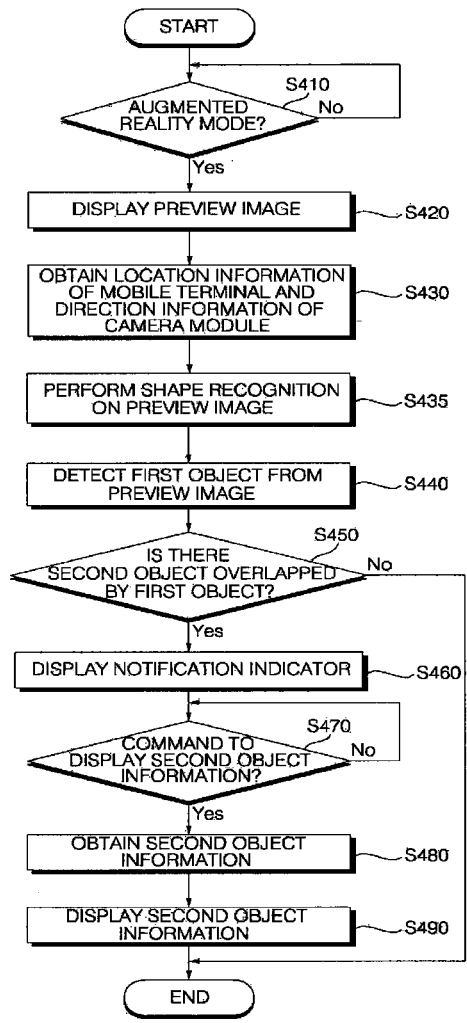

MOBILE TERMINAL AND OPERATING METHOD THEREOF

CROSS-REFERENCE TO RELATED APPLICATION

This application claims the priority benefit of Korean Patent Application No. 10-2010-0042620, filed on May 6, 2010, in the Korean Intellectual Property Office, the disclosure of which is incorporated herein by reference.

BACKGROUND OF THE INVENTION

1. Field of the Invention

The present invention relates to a mobile terminal and an operating method thereof, and more particularly, to a mobile terminal capable of embodying augmented reality and an operating method of the mobile terminal.

2. Description of the Related Art

Mobile terminals are portable devices capable of performing voice/video calls, inputting and outputting information, and/or storing data. As the functions of mobile terminals diversify, an increasing number of mobile terminals have been equipped with various complicated functions, such as capturing photos and moving images, playing music files and moving image files, providing games, receiving broadcast programs, and providing wireless Internet services, and have thus evolved into multifunctional multimedia players.

Most mobile terminals are equipped with cameras and are thus being used to capture photos or videos. With the help of advanced mobile camera technology, various techniques, called augmented reality techniques, have been developed for providing a view of a physical real-world environment together with additional information regarding the real-world view.

Augmented reality is a term for the mixture of a view of a physical real world and information regarding the physical real world. Augmented reality techniques can allow users to easily obtain information regarding their surroundings with an enhanced sense of reality.

A method is needed to provide various useful information to users through augmented reality.

SUMMARY OF THE INVENTION

The present invention provides realizing augmented reality, and particularly, a mobile terminal capable of providing information regarding objects that are not even within a preview image and an operating method of the mobile terminal.

According to an aspect of the present invention, there is provided a mobile terminal including a camera module; a display module configured to display a preview image provided by the camera module; a wireless communication unit configured to wirelessly communicate with an external device; and a controller configured to obtain location information of the mobile terminal through wireless communication with the external device and obtain object information of a first object displayed in the preview image based on the location information, wherein, if there exists object information of a second object that is overlapped by the first object, the controller displays an notificaion indicator indicating the existence of the object information of the second object on the display module.

According to another aspect of the present invention, there is provided an operating method of a mobile terminal, the operating method including displaying a preview image provided by a camera module; obtaining position information of the mobile terminal; and if the position information of the mobile terminal indicates that there exists object information of a second object that is overlapped by a first object displayed in the preview image, displaying the object information of the second object and an notification indicator indicating the existence of the object information of the second object on the preview image.

BRIEF DESCRIPTION OF THE DRAWINGS

The above and other features and advantages of the present invention will become more apparent by describing in detail preferred embodiments thereof with reference to the attached drawings in which:

FIG. 4 illustrates a flowchart of an operating method of a mobile terminal, according to an exemplary embodiment of the present invention;

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
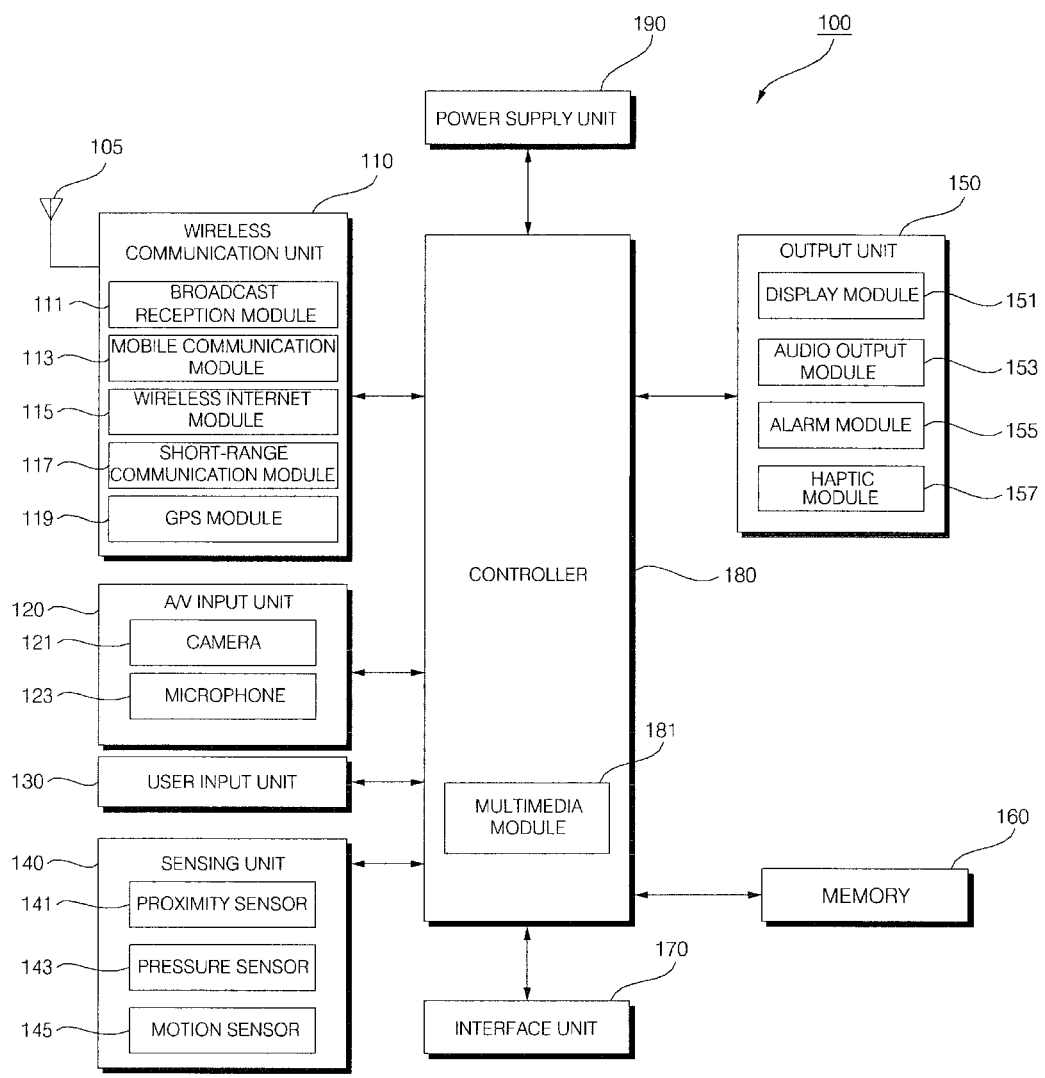
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Here, when the above constituent elements are implemented, two or more of the constituent elements may be combined into one constituent element, or one constituent element may be divided into two or more constituent elements, if appropriate.

The wireless communication unit 110 may include a broadcast reception module 111, a mobile communication module 113, a wireless internet module 115, a short-range communication module 117, and a global positioning system (GPS) module 119.

The broadcast reception module 111 may receive broadcast signals and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111.

The broadcast reception module 111 may receive broadcast signals using various broadcasting systems. In particular, the broadcast reception module 111 may receive digital broadcast signals using various digital broadcasting systems. In addition, the broadcast reception module 111 may be suitable not only for digital broadcasting systems but also for nearly all types of broadcasting systems other than digital broadcasting systems. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive location information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode and may convert the received sound signals into electrical audio data. During the call mode, the mobile communication module 113 may convert the electrical sound data into data that can be readily transmitted to a mobile communication base station, and may then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 may determine a current state of the mobile terminal 100 such as whether the mobile terminal 100 is opened or closed, the location of the mobile terminal 100 and whether the mobile terminal 100 is placed in contact with the user, and may generate a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a motion sensor 145. The proximity sensor 141 may detect an approaching object or whether there is an object nearby the mobile terminal 100 without mechanical contact. More specifically, the proximity sensor 141 may detect an approaching object based on a change in an alternating current (AC) magnetic field or a static magnetic field, or the rate of change of capacitance. The sensing unit 140 may include two or more detection sensors 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, two or more acceleration sensors representing different axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphical user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device capable of receiving information by being touched by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving an incoming call or message. In addition, the alarm module 155 may receive a key signal and may output an alarm signal as feedback to the key signal Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a list of contacts, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
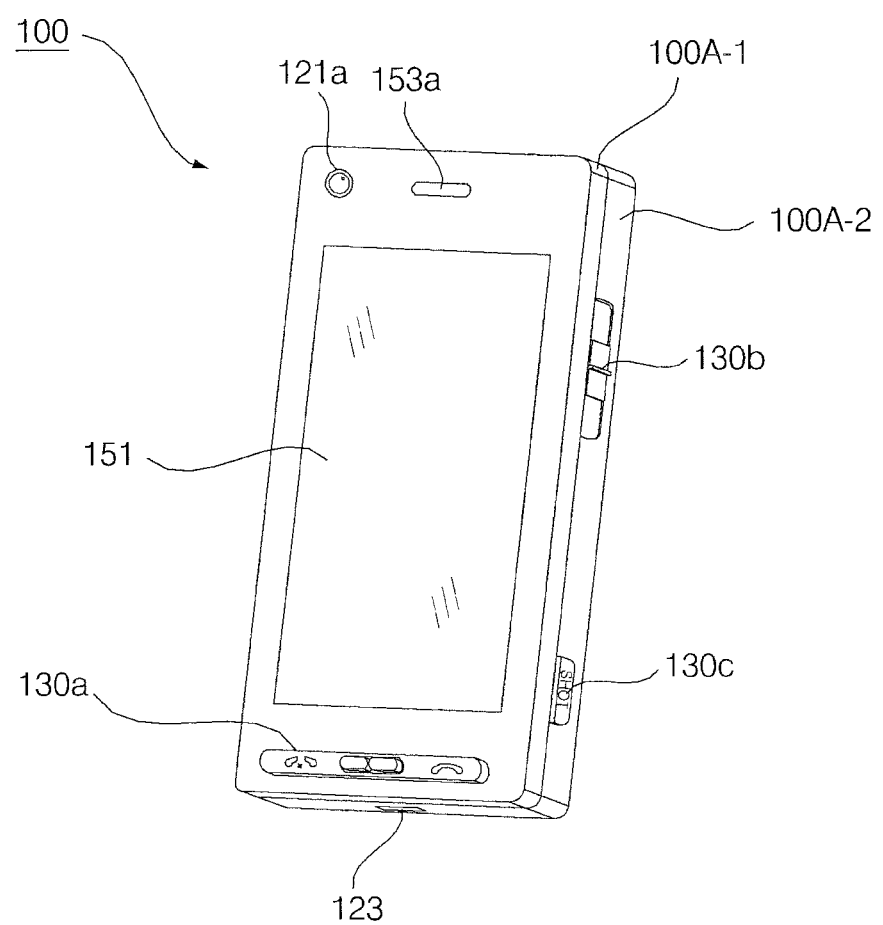
FIG. 2 illustrates a front perspective view of the mobile terminal shown in FIG. 1.

FIG. 2 illustrates a front perspective view of the mobile terminal 100. Referring to FIG. 2, the exterior of the mobile terminal 100 may be formed by a front case 100A-1 and a rear case 100A-2. Various electronic devices may be installed in the space formed by the front case 100A-1 and the rear case 100A-2. At least one middle case (not shown) may be additionally provided between the front case 100A-1 and the rear case 100A-2. The front case 100A-1, the rear case 100A-2 and the middle case(s) may be formed of a synthetic resin through injection molding. Alternatively, the front case 100A-1 and the rear case 100A-2 may be formed of a metal such as stainless steel (STS) or titanium (Ti).

The display module 151, a first audio output module 153a, a first camera 121a, and a first user input module 130a may be disposed in the main body of the mobile terminal 100, and particularly, in the front case 100A-1. Second and third user input modules 130b and 130c and the microphone 123 may be disposed on one side of the rear case 100A-2.

The display module 151 may include an LCD or OLED that can visualize information. If a touch pad is configured to overlap the display module 151 and thus to faun a mutual layer structure, the display module 151 may serve as a touch screen. Thus, the user can enter various information simply by touching the display module 151.

The first audio output module 153a may be implemented as a receiver or a speaker. The first camera 121a may be configured to be suitable for capturing a still or moving image of the user. The microphone 123 may be configured to properly receive the user's voice or other sounds.

The first through third user input modules 130a through 130c and fourth and fifth user input modules 130d and 130e may be collectively referred to as the user input unit 130. The user input unit 130 may adopt various tactile manners as long as it can offer tactile feedback to the user.

For example, the user input unit 130 may be implemented as a dome switch or touch pad capable of receiving a command or information by being pushed or touched by the user; or a wheel, a jog dial or wheel, or a joystick capable of receiving a command or information by being rotated. More specifically, the first user input module 130a may be used to enter various commands such as 'start', 'end', and 'scroll' to the mobile terminal 100, the second user input module 130b may be used to select an operating mode for the mobile terminal 100, and the third user input module 130c may serve as a hot key for activating certain functions of the mobile terminal 100.

When the display module 151 is approached by the user's finger, the proximity sensor 141 may detect the existence of the approaching finger, and may output a proximity signal. The proximity sensor 141 may output different proximity signals according to the distance between the display module 151 and the approaching finger. For a precise detection of the approaching finger, a plurality of proximity sensors 141 having different detection ranges may be employed. In this case, it is possible to precisely determine the distance between the approaching finger and the display module 151 by comparing a plurality of proximity signals respectively provided by the plurality of proximity sensors 141. In addition, it is possible to determine which part of the display module 151 is being approached by the approaching finger and whether the approaching finger is being moved within the close vicinity of the display module 15 by determining which of the plurality of proximity sensors 141 are outputting proximity signals. The controller 180 may identify a touch key, if any, currently being approached by the approaching finger and may then control the haptic module 157 to generate a vibration signal corresponding to the identified touch key.

When the user tilts or shakes the mobile terminal 100, the motion sensor 145 may detect the movement of the mobile terminal 100, and may generate a signal corresponding to the detected movement to the controller 180. The controller 180 may extract various motion information such as the direction, angle, speed and intensity of the movement of the mobile terminal 100 and the location of the mobile terminal 100 from the signal provided by the motion sensor 145.

The controller 180 may keep track of the movement of the mobile terminal 100 based on the extracted motion information. The type of motion information that can be extracted from the signal provided by the motion sensor 145 may vary according to the type of motion sensor 145. Thus, more than one motion sensor 145 capable of providing desired motion information may be employed in the mobile terminal 100. The controller 180 may control the motion sensor 145 to operate only when a predetermined application is executed.

Figure 3:
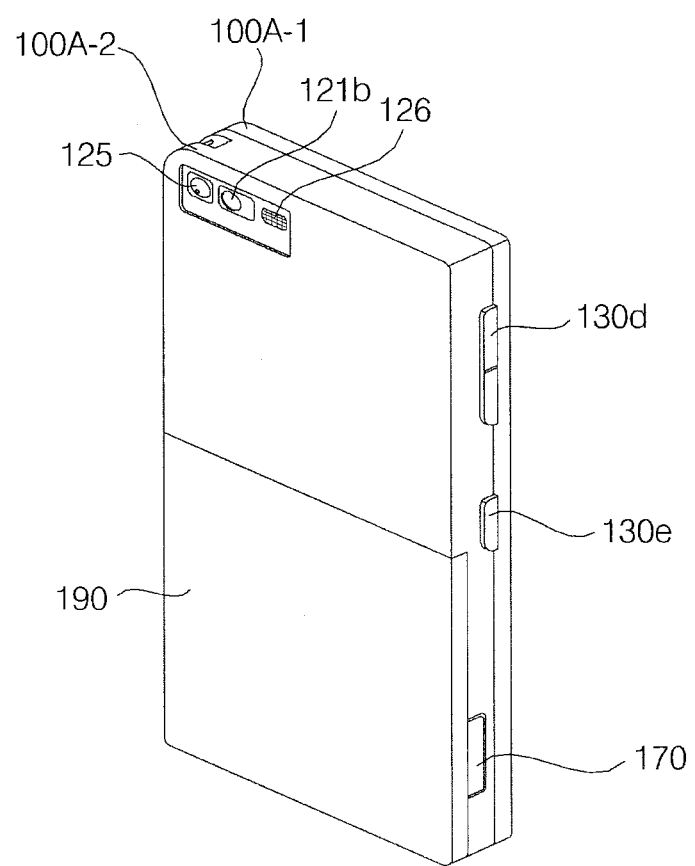
FIG. 3 illustrates a rear perspective view of the mobile terminal shown in FIG. 2.

FIG. 3 illustrates a rear perspective view of the mobile terminal 100. Referring to FIG. 3, the fourth and fifth user input modules 130d and 130e and the interface unit 170 may be disposed on one side of the rear case 100A-2, and a second camera 121b may be disposed at the back of the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a camera flash 126 may be disposed near the second camera 121b. The mirror 125 may be used for the user to prepare him- or herself for taking a self-portrait. The cameral flash 126 may be used to illuminate a subject when the user attempts to capture an image of the subject with the second camera 121b.

A second audio output module (not shown) may be additionally provided in the rear case 100A-2. The second audio output module may realize a stereo function along with the first audio output module 153a. The second audio output module may also be used in a speaker-phone mode.

Not only an antenna (not shown) for making or receiving a call but also an antenna (not shown) for receiving a broadcast signal may be disposed on one side of the rear case 100A-2. The antennas may be installed so as to be able to be retracted from the rear case 100A-2.

The interface unit 170 may serve as a pathway for allowing the mobile terminal 100 to exchange data with an external device. For example, the interface unit 170 may include at least one of a connector for connecting earphones to the mobile terminal wiredly or wirelessly, a port for performing short-range communication, and a power supply port for supplying power to the mobile terminal 100. Alternatively, the interface unit 170 may include a card socket for receiving a SIM card, a UIM card or an exterior card such as a memory card.

The power supply unit 190, which supplies power to the mobile terminal 100, may be disposed in the rear case 100A-2. The power supply unit may be a rechargeable battery and may be coupled to the rear case 100A-2 so as to be attachable to or detachable from the rear case 100A-2.

The second camera 121b and the other elements that have been described as being provided in the rear case 100A-2 may be provided in the front case 100A-1. In addition, the first camera 121a may be configured to be rotatable and thus to cover the photographing direction of the second camera 121b. In this case, the second camera 121b may be optional.

It will hereinafter be described in detail how to realize augmented reality with the use of the mobile terminal 100. In the following exemplary embodiments, it will be assumed, for convenience, that the display module 151 is a touch screen.

FIG. 4 illustrates a flowchart of an operating method of a mobile terminal, according to an exemplary embodiment of the present invention, and particularly, a method to provide object information of an object that is not even within a preview image. Referring to FIG. 4, if an augmented reality mode is selected (S410), a preview image provided by the camera module 121 may be displayed on the display module 151 (S420). More specifically, if the user selects the augmented reality mode with reference to, for example, the manual of the mobile terminal 100, the preview image, which is for previewing exposure and/or framing before taking a photograph, may be displayed on the display module 151. The augmented reality mode is a mode for providing a view of a physical real world and information regarding the physical real world.

Thereafter, the controller 180 may obtain location information of the mobile terminal 100 and direction information of the camera module 121 (S430). More specifically, the controller 180 may obtain the location information of the mobile terminal 100 from, for example, the GPS module 119, and the direction information of the camera module 121 from, for example, a direction sensor (not shown) attached to the camera module 121. Since the camera module 121 is incorporated into the mobile terminal 100, the location information of the mobile terminal 100 may be considered to be the same as location information of the camera module 121.

GPS information of the mobile terminal 100 may be obtained as the location information of the mobile terminal 100, but the present invention is not restricted to this. That is, the controller 180 may obtain the location information of the mobile temiinal 100 using various other methods than using the GPS module 119, for example, using Assisted GPS (A-GPS), which is a system using assistance data available from a network, using a global satellite navigation system such as Galileo or Glonass, using a Wireless Fidelity (Wi-Fi) positioning system (WPS), using cell identification (ID), which is a mobile positioning method using the cell ID of a base station where a mobile terminal bearer belongs, using Bluetooth, and using radio frequency identification (RFID).

If the mobile terminal 100 is located in an outdoor environment, the location information of the mobile terminal 100 can be obtained using the GPS module 119. On the other hand, if the mobile terminal 100 is located in an indoor environment, the location information of the mobile terminal 100 can be obtained using the wireless internet module 115 or the short-range communication module 117.

The direction information of the camera module 121 can also be obtained based on the displacement in the position of the mobile terminal 100 especially when the mobile terminal 100 is on the move with the direction of the camera module 121 fixed.

In this exemplary embodiment, the controller 180 may obtain the location information of the mobile terminal 100 from the wireless communication unit 110 and the direction information of the camera module 121 from the direction sensor attached to the camera module 121, but the present invention is not restricted to this. That is, the user may enter initial location information and initial direction information to the mobile terminal 100 through the user input unit 130. Then, the controller 180 may determine the position and direction of the camera module 121 by comparing the initial location information and the initial direction information with sensing data provided by a gyro sensor (not shown) of the mobile terminal 100.

Thereafter, the controller 180 may perform shape recognition and may thus detect one or more objects, if any, from the preview image displayed in operation S410 (S435). There is no restriction to the type of object that that can be subjected to shape recognition. Preferably, objects of a predetermined size or greater, having object information, such as buildings, may be subjected to shape recognition. The object information may be information specifying the name, functions and origin of an object. If an object subjected to shape recognition is a building, the object information may include the name of the building, various services provided in the building and information regarding the providers of the services.

Shape recognition is a method of detecting the shape of an object that can be classified into a predefined model class from a preview image and restoring geometric information of the detected shape. Various shape recognition techniques such as control point detection or shape rendering can be used in operation S435, but the present invention is not restricted to this.

Operations S435 and S440 may be performed in inverse order.

The controller 180 may identify a first object detected from the preview image based on location information and direction information of the camera module 121 and the results of shape recognition performed in operation S435 (S440). More specifically, the controller 180 may compare the location information and direction information of the camera module 121 and the results of shape recognition performed in operation S435 with object information present in an object information database (not shown) of the memory 160. If object information (hereinafter referred to as the first object information) of the first object is not present in the memory 160, the mobile terminal 100 may access an external device having its own object information database via the wireless communication unit 110 and may thus search the object information database of the external device for the first object information. In the object information database of the memory 160, object information and location information of each object may be stored in connection with each other.

In this exemplary embodiment, the detection of an object from the preview image may be performed using the location information and direction information of the camera module 121 and the results of shape recognition performed in operation S4350, but the present invention is not restricted to this. That is, the controller 180 may not necessarily have to use all the location information and direction information of the camera module 121 and the results of shape recognition performed in operation S435. Instead, the controller 180 may detect objects from the preview image by using at least one of the location information and direction information of the camera module 121 and the results of shape recognition performed in operation S435. However, when using all the location information and direction information of the camera module 121 and the results of shape recognition performed in operation S435, it is possible to enhance the precision of the detection of objects from the preview image.

Referring back to FIG. 4, the controller 180 may determine the existence of a second object which is overlapped by the first object and is thus not displayed in the preview image (S450). More specifically, the second object may be an object which stands directly behind the first object and is thus blocked from view by the first object even though being within the viewing angle of the camera module 121. The controller 180 may determine whether object information (hereinafter referred to as second object information) of the second object is present in the object information database of the memory 160. There is a restriction in the type of object that can be determined as a second object. For example, only objects having their own object information may be classified as second objects.

Given the possibility that, in reality, there are too many objects overlapped by the first object, the controller 180 may impose a restriction on the range of objects that can be determined as second objects. For example, the controller 180 may consider only objects within a predetermined distance of the mobile terminal 100 as possible candidates for a second object. If the mobile terminal 100 is in an indoor environment, the controller 180 may consider only objects within the same indoor environment as the mobile terminal 100 as possible candidates for a second object.

If it is determined in operation S450 that there is a second object overlapped by the first object, the controller 180 may generate a second notification indicator indicating the existence of the second object information, and may display the second notification indicator over the preview image (S460). In order to distinguish the second notification indicator from a first notification indicator indicating the existence of the first object information, the first and second notification indicators may be displayed in different sizes or shapes, or may be displayed in connection with their respective object information. The first and second notification indicators may be displayed as icons of a certain shape or color or as symbols.

Thereafter, the controller 180 may determine whether a command to display the second object information has been received via the user input unit 130 (S470). The user may enter the command to display the second object information by selecting the second notification indicator.

If it is determined in operation S470 that the command to display the second object information has been received, the controller 180 may read out the second object information from the object information database in the memory 160 (S480). The second object information may be object information specifying the second object, and may include a captured image of the second object, a virtual image of the second object, text information defining the second object, an icon or symbol representing the second object, descriptions of the functions of the second object, and information regarding sub-objects included in the second object.

Thereafter, the controller 180 may display the read-out second object information over the preview image (S490).

In this exemplary embodiment, the controller 180 may display the second notification indicator in response to the detection of the second object, and may withdraw the second object information from the memory 160 in response to a command to display the second object information. However, the present invention is not restricted to this. That is, the controller 180 may withdraw the second object information from the memory 160 and may then display the second notification indicator.

The second notification indicator and the second object information may be displayed separately. Alternatively, the second object information may be displayed with, for example, a dotted outline in order to indicate that the second object information is information regarding an object overlapped by another object. In this case, the dotted outline may serve as the second notification indicator.

It will hereinafter be described in detail how to display information regarding an object overlapped by another object in a preview image.

Figure 5A:
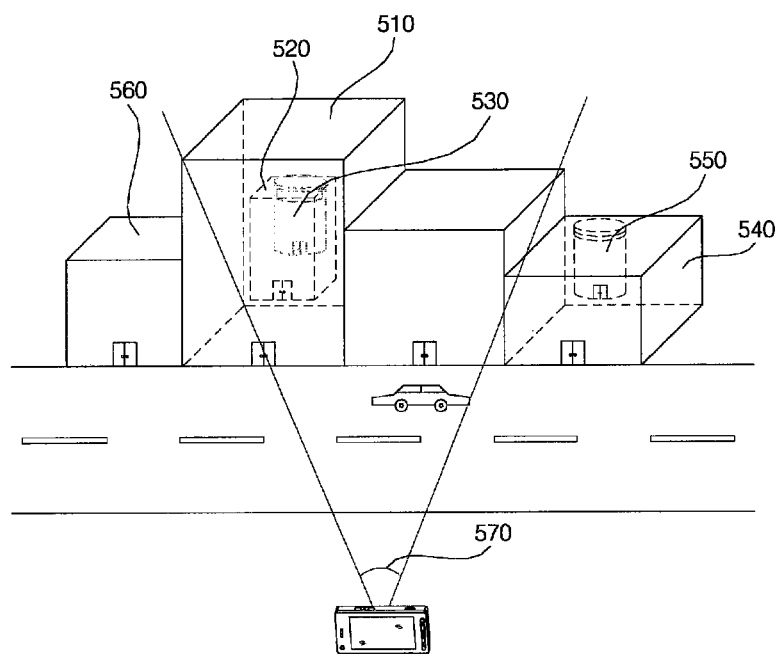
FIGS. 5A and 5B illustrate diagrams for explaining the concept of the overlapping relationship between objects in a preview image.
Figure 5B:
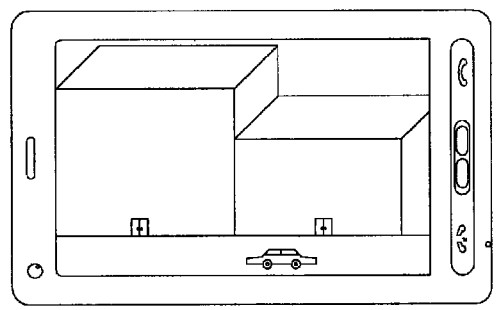

FIGS. 5A and 5B illustrate diagrams for explaining the concept of the overlapping relationship between objects in a preview image. Referring to FIG. 5A, a second object 520 stands behind a first object 510, and a third object 530 stands behind the second object 520. Referring to FIG. 5B, if the user turns the camera module 121 toward the first object 510 while standing in front of the first object 510, the first object 510, which falls within a viewing angle 570 of the camera module 121 and directly faces the camera module 121, can be seen in a preview image provided by the camera module 121, whereas the second and third objects 520 and 530 cannot be seen in the preview image.

In this case, in order to obtain information of the second or third object 520 or 530, which is overlapped by the first object 510, the user may bother to find his or her way to the second or third object 520 or 530 and turn the camera module 121 directly toward the second or third object 520 or 530.

Therefore, a method is needed to provide object information of objects that are not even displayed in a preview image and thus to provide information of a wider area than that displayed in the preview image.

Figure 6:
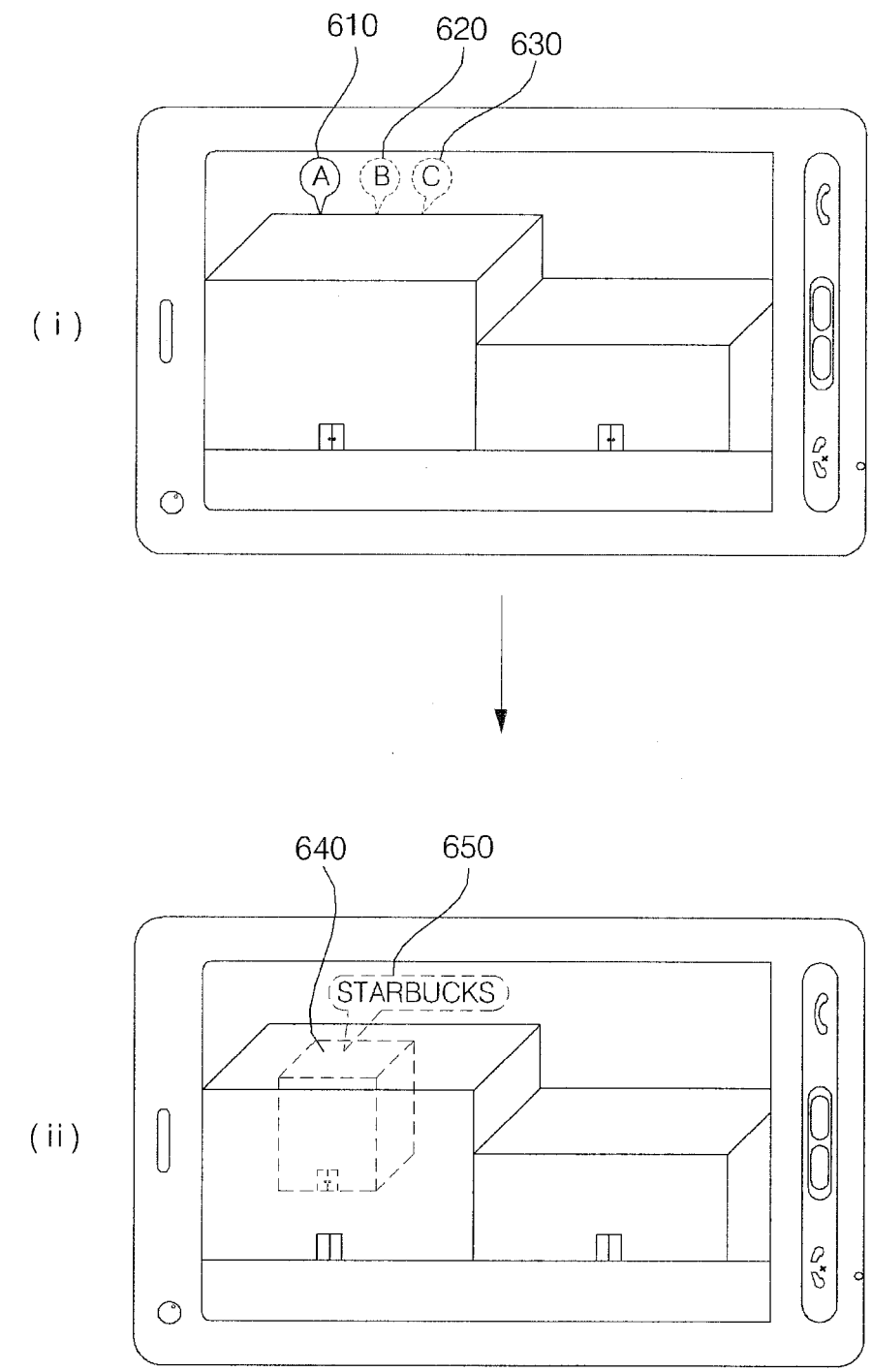
FIG. 6 illustrates diagrams for explaining an embodiment of how to display object information of an overlapped object.

FIG. 6 illustrates diagrams for explaining how to display object information of an overlapped object. For convenience, assume that there are three objects standing in line, i.e., first, second and third objects 510, 520 and 530, as shown in FIG. 5A, that only the first object 510 can be seen in a preview image provided by the camera module 121, and that the second and third objects 520 and 530 stand behind the first object 510 and have their own object information.

In this case, referring to FIG. 6(*i*), first, second and third notification indicators 610, 620 and 630 may be activated and displayed on a preview image provided by the camera module 121. The first notification indicator 610 may indicate the existence of first object information, which is object information of the first object 510, the second notification indicator 620 may indicate the existence of second object information, which is object information of the second object 520, and the third notification indicator 630 may indicate the existence of third object information, which is object information of the third object 530. Since the first object 510 is displayed in the preview image, the first notification indicator 610 may be displayed with a solid outline. On the other hand, since the second and third objects 520 and 530 are not displayed in the preview image, the second and third notification indicators 620 and 630 may be displayed with a dotted outline. In short, an notification indicator for a non-overlapped object and an notification indicator for an overlapped object may be displayed in different shapes, thereby allowing the user to intuitively determine whether each object in a preview image is located in a visible place.

More specifically, an notification indicator for a non-overlapped object and an notification indicator for an overlapped object may differ from each other in size, color, brightness and/or grayscale. For example, an notification indicator for an overlapped object may be smaller than an notification indicator for a non-overlapped object. Alternatively, an notification indicator for an overlapped object may be darker than an notification indicator for a non-overlapped object.

In order to obtain object information of the second object 520, which stands behind the first object 510, the user may select the second notification indicator 620 by touching the second notification indicator 620.

Then, referring to FIG. 6(*ii*), a second position indicator 640, which is an indicator of the position of the second object 520, and second object information 650, which is the object information of the second object 520, may be displayed on the display module 151. More specifically, the second position indicator 640 may be displayed in order to indicate the relative position of the second object 520 to the first object 510. The second position indicator 640 may be unnecessary if the second notification indicator 620 is suggestive enough to imply the relative position of the second object 520 to the first object 510.

A predefined amount of time after the display of the second position indicator 640 and the second object information 650, the second position indicator 640 and the second object information 650 may automatically disappear from the preview image without a requirement of the receipt of a user command so that only the first, second and third notification indicators 610, 620 and 630 can remain on the preview image. However, the present invention is not restricted to this. That is, the second position indicator 640 and the second object information 650 may be configured to disappear from the preview image upon the receipt of a predetermined user command. In this case, the predetermined user command may be a command to display object information, other than the second object information 650.

In short, when there exists object information, an notification indicator may be displayed. Then, if a command to display the object information is received, the object information may be displayed in response to the received command. However, the present invention is not restricted to this. In addition, an notification indicator and/or a position indicator may be incorporated into object information.

Figure 7:
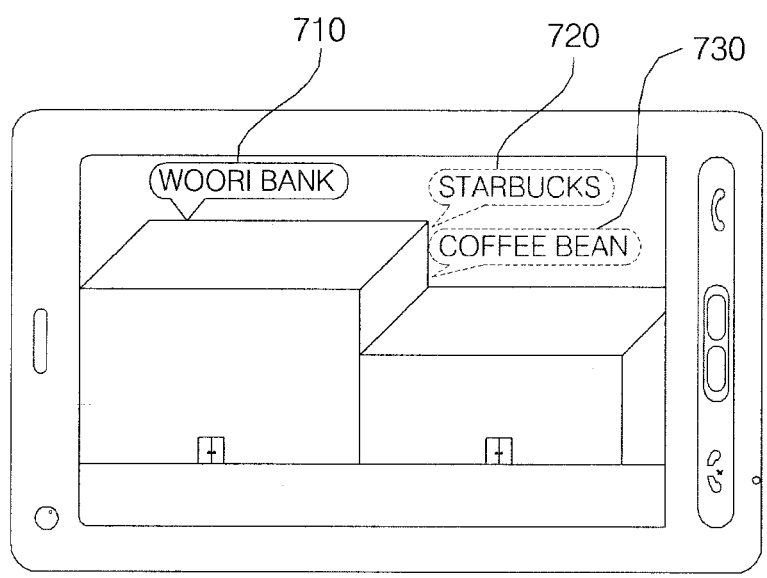
FIG. 7 illustrates a diagram for explaining an embodiment of how to incorporate an notification indicator into object information.

FIG. 7 illustrates a diagram for explaining an embodiment of how to incorporate an notification indicator into object information. Referring to FIG. 7, each of first, second and third object information 710, 720 and 730 may include text and a solid or dotted line around the text. The solid or dotted line of the first, second and third object information 710, 720 and 730 may serve the function of an notification indicator. More specifically, since the first object information 710 is object information of a non-overlapped object, the first object information 710 may be displayed with a solid outline. On the other hand, since the second object information 720 is object information of an overlapped object, the second object information 720 may be displayed with a dotted outline so as to be easily distinguishable from the first object information 710. Alternatively, the text data of each of the first, second and third object information 710, 720 and 730 may be used to serve the function of an notification indicator.

If there are many pieces of object information displayed all over a preview image, the preview image may appear distracting, and the user may get eye fatigue from looking at the preview image. In order to address this problem, object information of an object displayed in a preview image may be displayed near the corresponding object, and object information of an object overlapped by the object displayed in the preview image may be displayed on a designated part of the preview image, for example, on one side of the preview image. Alternatively, all object information may be displayed together on one side of a preview image.

Figure 8:
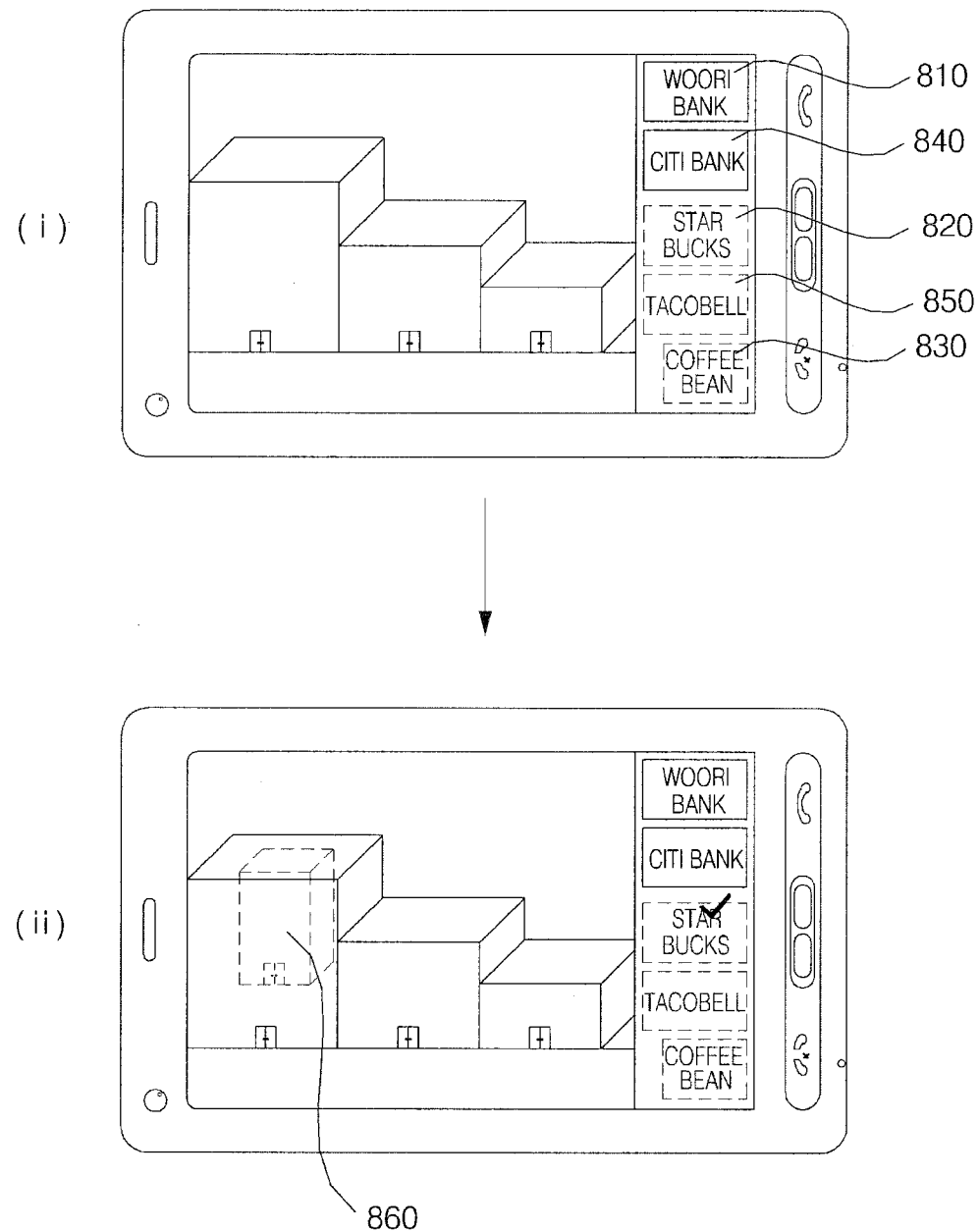
FIG. 8 illustrates diagrams for explaining an embodiment of how to display object information on a preview image.

FIG. 8 illustrates diagrams for explaining an embodiment of how to display object information on a preview image. Referring to FIG. 8(*i*), assume that there are five objects (i.e., the first, second, and third objects 510, 520 and 530 and fourth and fifth objects 540 and 540) within a predetermined distance of the mobile terminal 100, as shown in FIG. 5A, and that the controller 180 obtains five pieces of object information, i.e., first, second, third, fourth and fifth object information 810, 820, 830, 840, and 850 corresponding to the first, second, third, fourth and fifth objects 510, 520, 530, 540 and 550, respectively. The controller 180 may display the first, second, third, fourth and fifth object information 810, 820, 830, 840, and 850 on one side of a preview image in descending order of distance.

The size of an notification indicator for object information may be determined by how many times the object information is overlapped by other object information. More specifically, since the second object information 820 is overlapped once by the first object information 810 and the fifth object information 850 is overlapped once by the fourth object information 840, the size of an notification indicator for the second object information 820 may be the same as the size of an notification indicator for the fifth object information 850. Therefore, the user can intuitively determine that an object having the second object information 820 and an object having the fifth object information 850 are the same distance apart from the mobile terminal 100 or are within the same entity based on the size of the notification indicators for the second object information 820 and the fifth object information 850. Since the third object information 830 is overlapped twice by the first object information 810 and the second object information 820, the size of an notification indicator for the third object information 830 may be smaller than the size of the notification indicator for the second object information 820. Alternatively, the size of an notification indicator may be determined by how many times an object is overlapped in a preview image.

If a command to select object information is issued in order to determine the position of a corresponding object, a position indicator indicating the position of the corresponding object may be additionally displayed on the display module 151. For example, referring to FIGS. 8(*i*) and 8(*ii*), if the user selects the second object information 820, a second position indicator 860 indicating the position of the second object 520 may be displayed.

The first, second, third, fourth and fifth object information 810, 820, 830, 840, and 850 is illustrated in FIG. 8 as being arranged on a preview image in descending order of distance, but the present invention is not restricted to this. That is, the first, second, third, fourth and fifth object information 810, 820, 830, 840, and 850 may be arranged on a preview image in descending order of the distance of their respective objects from the mobile terminal 100.

Figure 9:
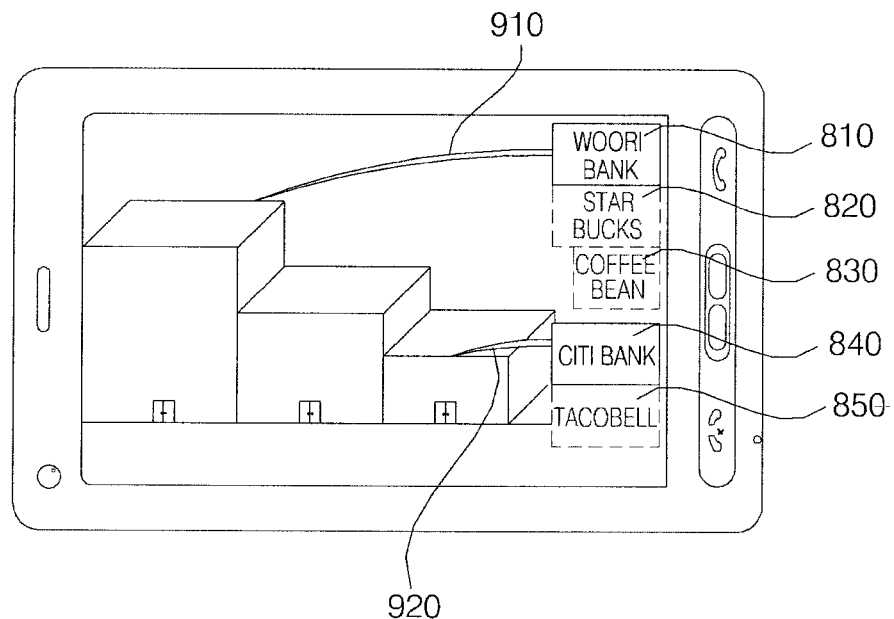
FIG. 9 illustrates a diagram for explaining another embodiment of how to display object information on a preview image.

FIG. 9 illustrates a diagram for explaining another embodiment of how to display object information on a preview image. Referring to FIG. 9, a plurality of pieces of object information may be displayed in connection with their respective objects. Thus, the user can easily determine whether and how the plurality of pieces of object information overlap each other. In addition, since position indicators 910 and 920 are rendered as lines each connecting object information and a corresponding object, the user can intuitively determine the location of each object information without the need to enter an additional command.

If there are too many pieces of object information to be displayed at once on the display module 151, a scrollbar may be provided so that the object information can be effectively scrolled through.

Referring to FIGS. 8 and 9, object information may be displayed on one side of a preview image, but the present invention is not restricted to this. That is, a preview image may be divided into a plurality of blocks, and object information may be displayed on one side of each of the blocks. Alternatively, object information may be displayed near a corresponding object in a preview image.

Figure 10:
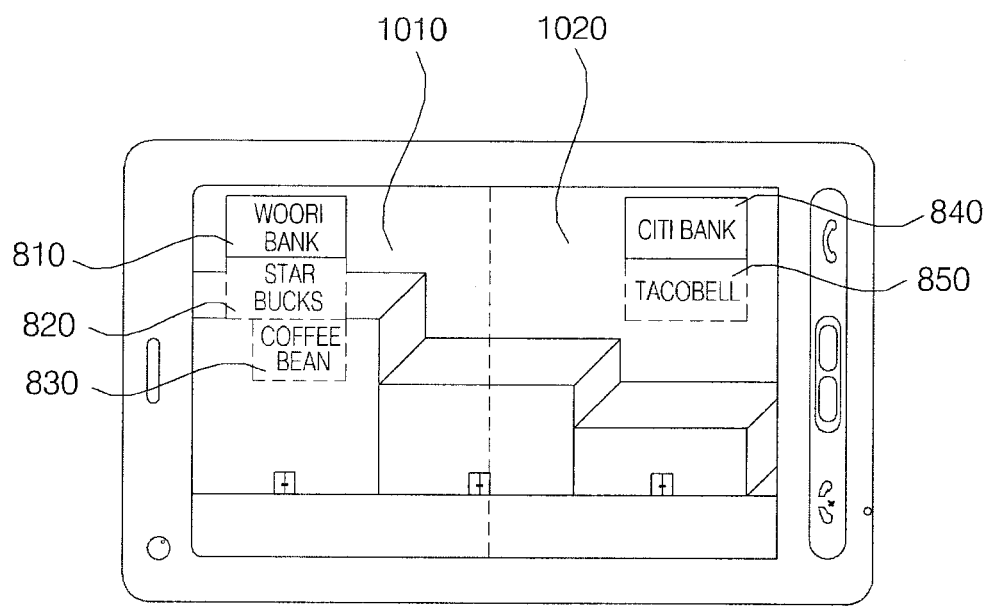
FIG. 10 illustrates a diagram for explaining another embodiment of how to display object information on a preview image.

FIG. 10 illustrates a diagram for explaining another embodiment of how to display object information on a preview image. Referring to FIG. 10, a preview image may be divided vertically into two blocks, i.e., first and second blocks 1010 and 1020. First, second and third object information 810, 820 and 830 may be displayed in the first block 1010 because they are located in the first block 1010. Similarly, fourth object information 840 and fifth object information 850 may be displayed in the second block 1020 because they are located in the second block 1020.

Therefore, the user can roughly understand the location of an object based on where on the display module 151 corresponding object information is displayed.

It has been described how to display object information of all objects within a predetermined distance of the mobile terminal 100 regardless of whether the objects are non-overlapped objects or overlapped objects, but the present invention is not restricted to this. That is, object information of only non-overlapped objects may be displayed on the display module 151. Object information of overlapped objects may be configured to be displayed in response to the receipt of a predetermined user command.

Figure 11:
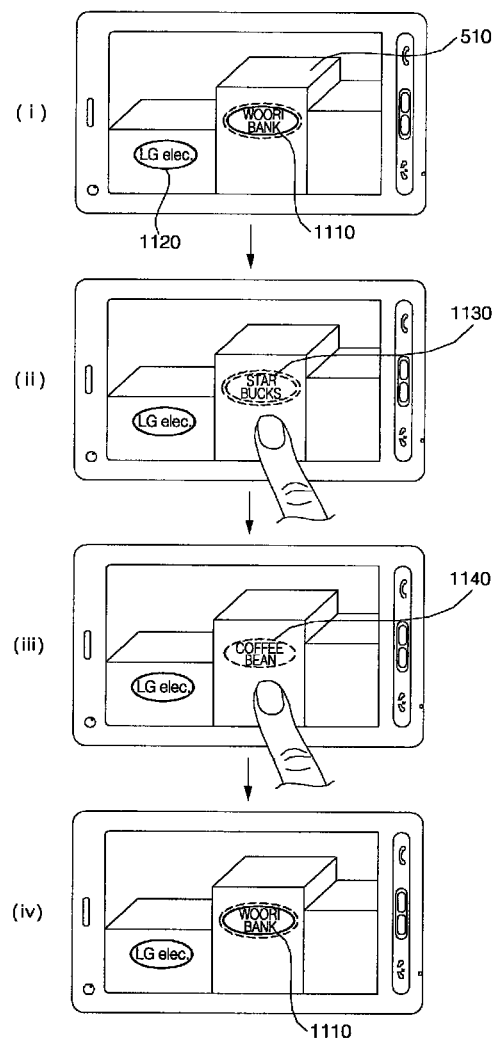
FIG. 11 illustrates diagrams for explaining another embodiment of how to display object information on a preview image.

FIG. 11 illustrates diagrams for explaining another embodiment of how to display object information on a preview image. Referring to FIG. 11(*i*), first object information 1110, which is object information of the first object 510 and also serves as an notification indicator, and sixth object information 1120, which is object information of a sixth object 560 and also serves as an notification indicator, may be displayed on a preview image. Referring to FIG. 5A, the first object 510 stands in front of and thus overlaps the second and third objects 520 and 530, whereas there is no object overlapped by the sixth object 560. Thus, the first object information 1110 may be displayed with both a solid line and a dotted line and may thus be able to be distinguished from the sixth object information 1120.

If the user touches a portion on the display module 151 where the first object 510 is displayed for more than a predefined amount of time (for example, for three seconds), the controller 180 may determine that a command to display object information of an object overlapped by the first object 510 has been received. Then, the controller 180 may display second object information 1130 on a preview image, instead of the first object information 1110, as shown in FIG. 11(*ii*). A predefined amount of time after the display of the second object information 1130, the controller 180 may display third object information 1140 on the preview image, instead of the second object information 1130, as shown in FIG. 11(*iii*). A predefined amount of time after the display of the third object information 1140, the controller 180 may display the first object information 1110 back on the preview image, as shown in FIG. 11(*iv*).

In short, referring to FIGS. 11(*i*) through 11(*iv*), a plurality of pieces of object information of overlapped objects may be displayed one after another at the same location on the display module 151 throughout the duration of a touch on the display module 151. Alternatively, the plurality of pieces of object information may be displayed together on the display module 151 throughout the duration of a touch on the display module 151. In this case, the user can easily determine the overlapping relationship between the plurality of pieces of object information.

In addition, a plurality of object information of overlapped objects may be selectively displayed according to the pressure of a touch on the display module 151, instead of according to the duration of a touch on the display module 151. For example, if a predetermined object is selected by a touch with a first pressure level or lower, object information of the predetermined object may be displayed. On the other hand, if the predetermined object is selected by a touch with pressure between the first pressure level and a second pressure level, object information of an object overlapped by the predetermined object may be displayed. Obviously, object information can be displayed using various touch methods, other than those set forth herein.

Referring to FIGS. 11(*i*) through 11(*iv*), object information into which an notification indicator is incorporated may be displayed. However, the present invention is not restricted to this. That is, an notification indicator may be incorporated into an object, instead of being incorporated into object information, and this will hereinafter be described in detail with reference to FIG. 12.

Figure 12:
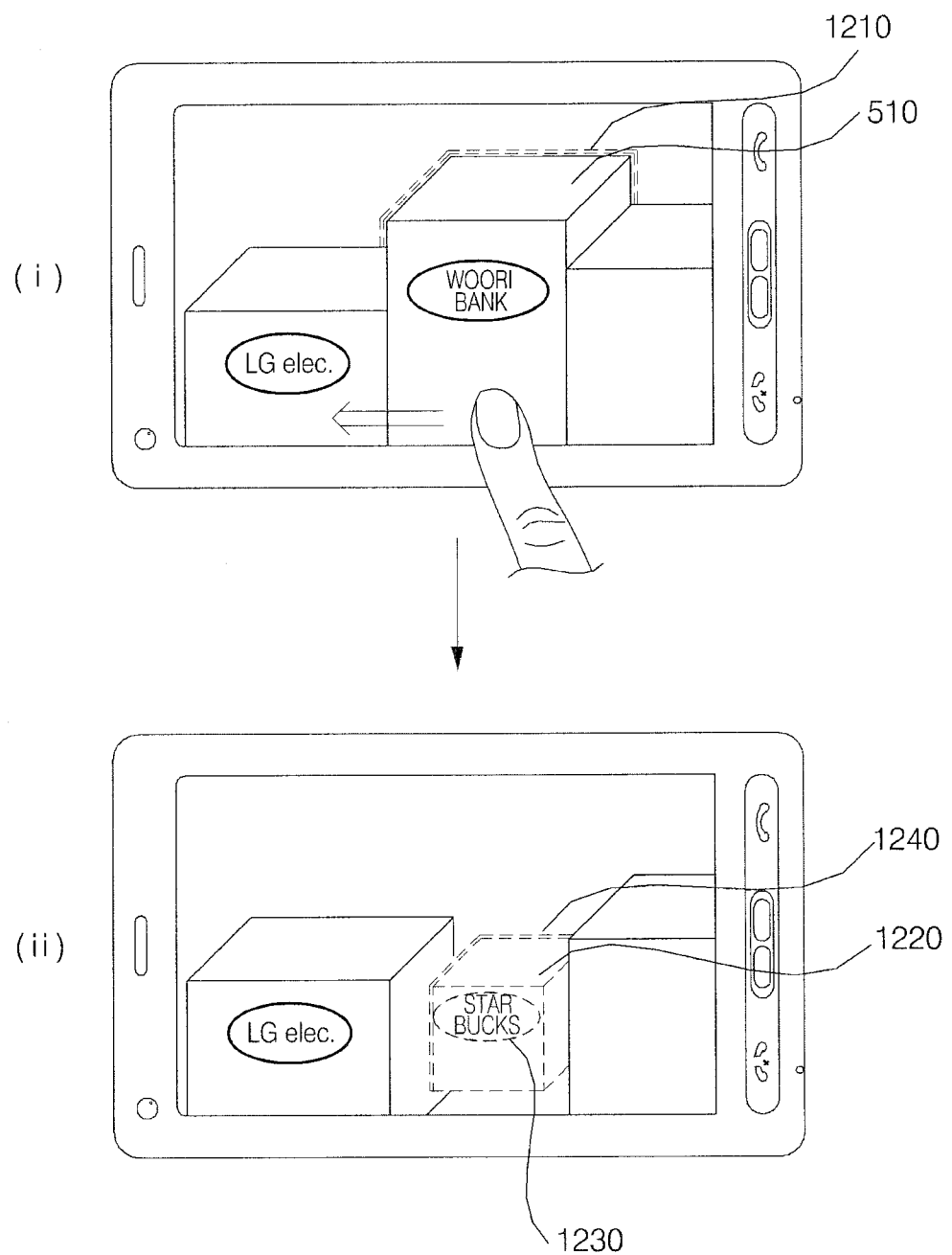
FIG. 12 illustrates diagrams for explaining an embodiment of how to incorporate an notification indicator into an object.

FIG. 12 illustrates diagrams for explaining an embodiment of how to incorporate an notification indicator into an object. Referring to FIG. 12(i), a second notification indicator 1210 may be displayed as a dotted line surrounding the first object 510. The user may enter a command to display object information of the second object 520, which is overlapped by the first object 510, by flicking the first object 510. Then, referring to FIG. 12(ii), the first object 510 may disappear, and an image 1220 and second object information 1230 of the second object 520 may be displayed. If there is an object overlapped by the second object 520, a third notification indicator 1240 may be displayed as a dotted line surrounding the image 1220.

The image 1220 and the second object information 1230 may be displayed, replacing the first object 510, but the present invention is not restricted to this. That is, the image 1220 and the second object information 1230 may be displayed over the first object 510, and this will hereinafter be described in detail with reference to FIG. 13.

Figure 13:
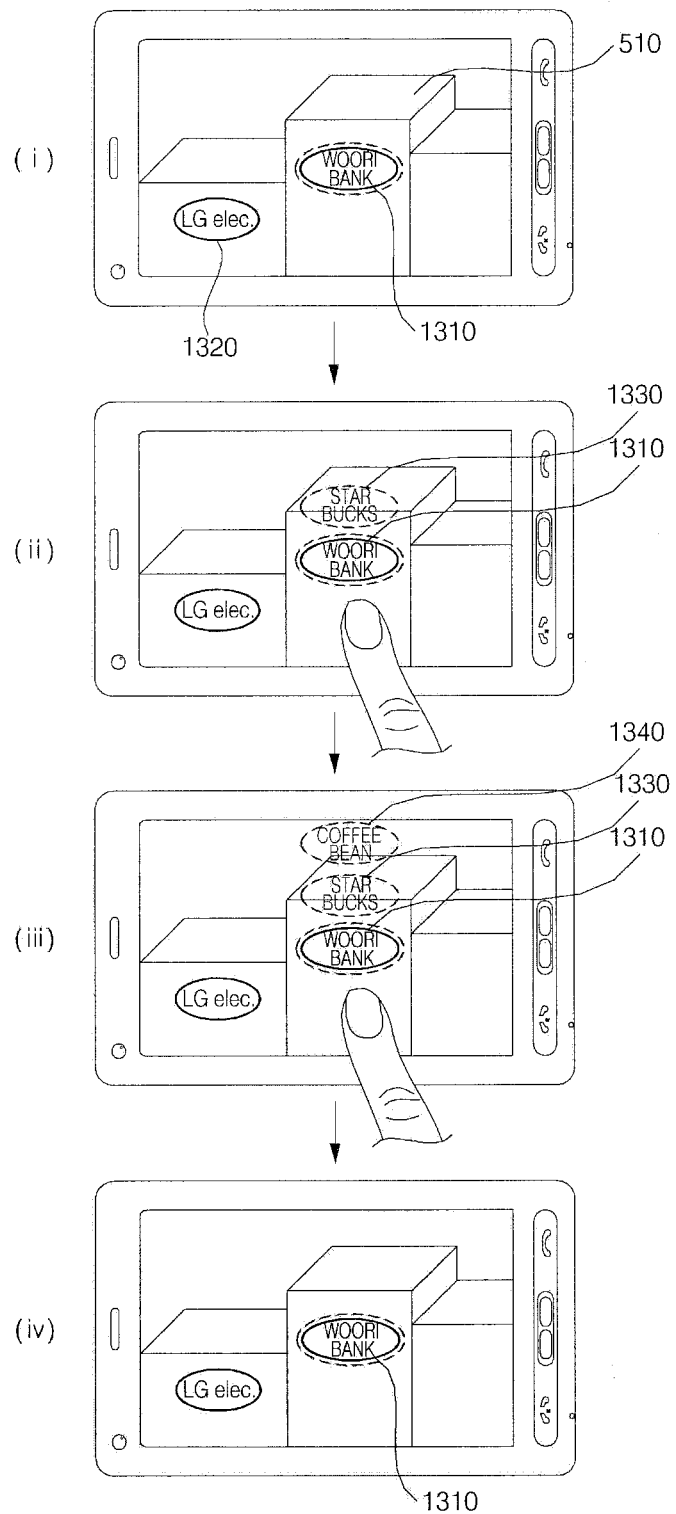
FIG. 13 illustrates diagrams for explaining another embodiment of how to display object information on a preview image.

FIG. 13 illustrates diagrams for explaining another embodiment of how to display object information on a preview image. Referring to FIG. 13(i), first object information 1310 and second object information 1320 may be displayed on a preview image, and an notification indicator may be incorporated into each of the first and sixth object information 1310 and 1320. Since the second and third objects 520 and 530 stand behind the first object 510, as shown in FIG. 5A, the first object information 1310 may be displayed with a solid line and a dotted line so as to be easily distinguishable from the sixth object information 1320.

In order to obtain object information of an object overlapped by the first object 510, the user may touch a portion on the display module 151 where the first object 510 is displayed for more than a predefined amount of time (for example, for three seconds). Then, the controller 180 may determine that a command to display object information of an object overlapped by the first object 510 has been received. A predefined amount of time later, the controller 180 may display second object information 1330 on the display module 151 together with the first object information 1310. A predefined amount of time after the display of the second object information 1330, the controller 180 may display third object information 1340 on the preview image together with the first object information 1310 and the second object information 1330, as shown in FIG. 11(iii). A predefined amount of time after the display of the third object information 1340, the controller 180 may display only the first object information 1110 on the preview image, as shown in FIG. 13(iv).

A plurality of pieces of object information of overlapped objects may be selectively displayed according to the pressure of a touch on the display module 151, instead of according to the duration of a touch on the display module 151. For example, if a predetermined object is selected by a touch with a first pressure level or lower, object information of the predetermined object may be displayed. On the other hand, if the predetermined object is selected by a touch with pressure between the first pressure level and a second pressure level, object information of an object overlapped by the predetermined object may be displayed. Obviously, object information can be displayed using various touch methods, other than those set forth herein.

In this exemplary embodiment, the user can be provided with object information of an object by turning the camera module 121 toward the object, but the present invention is not restricted to this. Once the user turns the camera module 121 toward a predetermined object, the controller 180 may obtain object information of an object overlapped by the predetermined object and may store the obtained object information. Thereafter, if the user enters a command to fix a preview image, a preview image currently being displayed on the display module 151 may remain unchanged even if the direction of the camera module 121 or the location of the mobile terminal 100 changes. In this case, the user can be provided with object information of an overlapped object simply by entering a predetermined command.

The mobile terminal and the operating method thereof according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal comprising:
a camera module;
a display module configured to display a preview image provided by the camera module;
a wireless communication unit configured to wirelessly communicate with an external device; and
a controller configured to obtain location information of the mobile terminal through wireless communication with the external device and obtain object information of a first object displayed in the preview image based on the location information, wherein when there exists object information of a second object that is overlapped by the first object, the controller displays a notification indicator indicating existence of the object information of the second object on the display module,
wherein the controller detects the first object using at least one of location info nation and direction information of the camera module and results of a shape recognition operation on the preview image, and the controller determines existence of the object information of the second object based on the location information of the camera module.

2. The mobile terminal of claim 1, wherein the controller displays a location indicator indicating a position of the second object on the display module.

3. The mobile terminal of claim 1, wherein the controller displays the object information of the second object on the display module.

4. The mobile terminal of claim 3, wherein when a command to display the object information of the second object is detected, the controller displays the object information of the second object on the display module.

5. The mobile terminal of claim 3, wherein the controller makes the object information of the first object disappear when displaying the object information of the second object.

6. The mobile terminal of claim 3, wherein the controller displays the object information of the second object instead of an image corresponding to the first object.

7. The mobile terminal of claim 1, wherein the controller incorporates the notification indicator into the object information of the second object.

8. The mobile terminal of claim 1, wherein the controller incorporates the notification indicator into the object information of the first object.

9. The mobile terminal of claim 8, wherein the display module includes a touch screen and the controller displays the object information of the second object when an area on the touch screen where the first object or the object information of the first object is displayed is touched.

10. The mobile terminal of claim 1, further comprising a memory configured to include an object information database, wherein the controller obtains the object information of the second object from the object information database.

11. The mobile terminal of claim 1, wherein the wireless communication unit is configured to communicate with an external device having an object information database, wherein the controller obtains the object information of the second object from the object information database through the wireless communication unit.

12. The mobile terminal of claim 11, wherein, in the object information database, object information and position information of each object is stored in connection with each other.

13. An operating method of a mobile terminal comprising:
displaying, on a display module, a preview image provided by a camera module;
obtaining position information of the mobile terminal;
detecting a first object displayed in the preview image using at least one of location information and direction information of the camera module and results of a shape recognition operation on the preview image;
determining whether there exists object information of a second object that is overlapped by the first object, based on the location information of the camera module; and
when there exists the object information of the second object that is overlapped by the first object displayed in the preview image, displaying a notification indicator indicating existence of the object information of the second object on the preview image.

14. The operating method of claim 13, wherein the displaying of the notification indicator comprises displaying a position indicator indicating a position of the second object.

15. The operating method of claim 13, wherein the displaying of the notification indicator comprises making the notification indicator disappear and displaying the object information of the second object in response to receipt of a command to display the object information of the second object.

16. The operating method of claim 15, wherein the displaying of the notification indicator comprises displaying the object information of the second object when an area on a touch screen where the first object or object information of the first object is displayed is touched.

17. The operating method of claim 13, further comprising incorporating the notification indicator into object information of the first object and displaying the object information of the first object.

* * * * *